(12) United States Patent
Lutter et al.

(10) Patent No.: US 12,373,196 B2
(45) Date of Patent: Jul. 29, 2025

(54) SMART GROUPING OF CODE PACKAGES

(71) Applicant: SAP SE, Walldorf (DE)

(72) Inventors: Steffen Lutter, Asnieres sur Seine (FR); Alexis Madinier, Boulogne Billancourt (FR); Xiaohui Xue, Courbevoie (FR)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 18/149,385

(22) Filed: Jan. 3, 2023

(65) Prior Publication Data

US 2024/0220237 A1 Jul. 4, 2024

(51) Int. Cl.
*G06F 8/70* (2018.01)
*G06F 8/71* (2018.01)

(52) U.S. Cl.
CPC ...................................... *G06F 8/71* (2013.01)

(58) Field of Classification Search
CPC .. G06F 8/71; G06F 8/60; G06F 16/22; G06Q 30/0603; G06Q 20/123; G06Q 30/0621; H04L 67/34

USPC .......................................................... 717/121
See application file for complete search history.

(56) References Cited

U.S. PATENT DOCUMENTS

| | | | |
|---|---|---|---|
| 9,547,714 B2* | 1/2017 | Ambasta | G06F 16/93 |
| 9,557,988 B2* | 1/2017 | Binjrajka | G06F 8/71 |
| 9,965,562 B2* | 5/2018 | Lawson | G06F 8/60 |
| 2012/0089485 A1* | 4/2012 | Williams | G06F 8/61 |
| | | | 705/26.61 |
| 2021/0073026 A1* | 3/2021 | Myers | G06F 11/3065 |
| 2024/0176594 A1* | 5/2024 | Garnatz | G06F 40/20 |

* cited by examiner

*Primary Examiner* — Hanh Thi-Minh Bui
(74) *Attorney, Agent, or Firm* — Buckley, Maschoff & Talwalkar LLC (57) ABSTRACT

Systems and methods include determination of a code package for publication to a repository, determination of an existing workflow, where the code package is to be published as a configuration of the existing workflow, determination of metadata of the existing workflow, determination of one or more applications associated with the configuration and, for each of the one or more applications, an edition associated with the configuration, and storage of the code package as the configuration in the repository in association with the metadata and identifiers of the one or more applications and associated editions.

14 Claims, 10 Drawing Sheets

SMART GROUPING OF CODE PACKAGES

BACKGROUND

Software applications, executed on-premise or in the cloud, have greatly increased the efficiency with which many tasks can be performed. Software-based automation systems compound these benefits by allowing non-technical users to design software-driven workflows which are executed by their local applications with little or no human intervention. The workflows may be used, for example, to perform automatic processing of incoming and/or stored data in response to a trigger or according to a defined temporal schedule.

Conventional automation systems require a user to manually capture each application to be used in a workflow, the user interfaces of the applications, and the particular elements within the user interfaces with which a user may interact. Next, the user manually creates automations using tools provided by the automation system. Specifically, the user may define a sequence of activities to be executed with respect to various ones of the defined user interface elements. The thusly-created automation must then be thoroughly tested and debugged before deployment in a production landscape.

Fulfilling these requirements can be time-consuming and error-prone, particularly when attempted by the non-technical user for whom such automated systems are intended. Developers therefore provide pre-built automations for use by users, either alone or in conjunction with a larger user-designed workflow. These automations may be available to users via a Web-based store which can be browsed to locate desired pre-built automations.

The developers/publishers of pre-built automations would like to expose their automations in such a store in a manner which allows a user to easily locate automations which provide desired functionality. Conventionally, the developer/publisher specifies metadata associated with an automation such as a name, a description, and other tags, and publishes the automation to the store along with the metadata. The store receives search terms (e.g., "invoicing") and/or filter values (e.g., Application='Microsoft Excel') from a user and identifies corresponding automations based on their associated metadata.

It may be difficult for a publisher to determine metadata for an automation which will result in accurate and easy identification of the automation by a user. Moreover, even if a user is able to locate an automation via a search request, the search results often include many different automations which have different technical requirements. Many of these different technical requirements might not be satisfied by the user's local computing system and therefore the corresponding automations cannot be used thereby.

DETAILED DESCRIPTION

The following description is provided to enable any person in the art to make and use the described embodiments. Various modifications, however, will be readily-apparent to those in the art.

Some embodiments facilitate the grouping of different code packages as configurations of a same "workflow" within a store. Each configuration corresponds to a specific set of local user applications and their respective editions which are required to execute the configuration. Advantageously, a publisher need not reproduce descriptive metadata when publishing a configuration of an existing workflow to the store, but rather may simply specify only the technical requirements of the configuration. Then, the configuration is added to the store in association with the technical requirements and with pre-existing metadata associated with the workflow.

These features support the efficient publication of distinct code packages (e.g., automations) which are dedicated to the same workflow but compatible with different user applications. These features may also allow a user to identify a required workflow more easily and, after the identification, select a configuration of that workflow which matches the technical configuration of the user's system.

Briefly, some embodiments operate to publish a code package to a store. First, a code package to be published is determined and, based on input from the publisher, an existing workflow of the store is also determined, of which the code package is a configuration. Pre-stored metadata (e.g., description, title, categories, lines of business) of the existing workflow is determined and application versions associated with the configuration are received from the publisher. The application versions are those application versions which are required to execute the configuration on a local computing system. The configuration is then saved in the store in association with the received application versions and the determined metadata. Search data structures of the store are updated based on the saved configuration, application and metadata, thereby allowing a user to identify the configuration and/or workflow using search functionality of the store.

Figure 1:
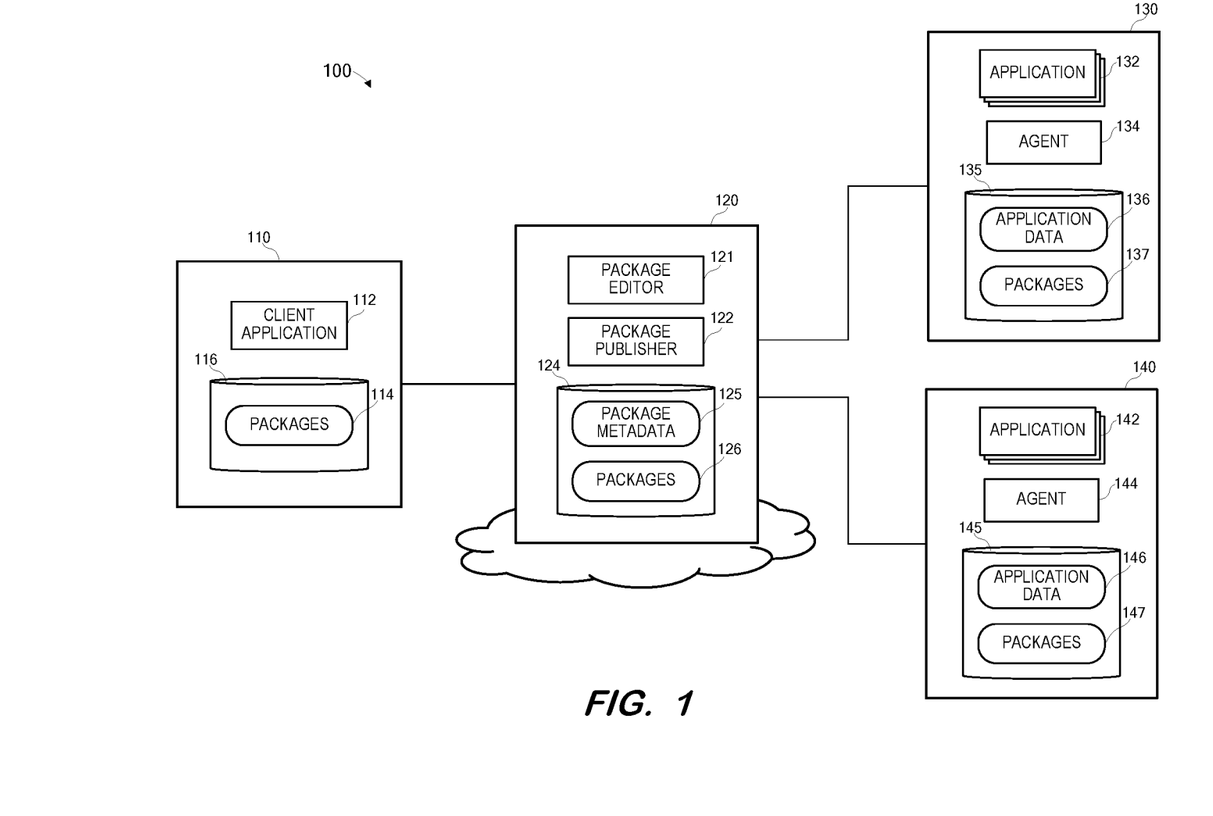
FIG. 1 is a block diagram of an architecture to publish and acquire code packages according to some embodiments.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Computing system 110 may be operated by a code developer and/or publisher to publish code packages to a code package repository, or store. The code packages described herein may be units of executable (i.e., compiled) program code, such as automations as will be described below, but embodiments are not limited thereto. According to some embodiments, computing system 110 executes program code of client application 112 to develop a code package and store the code package in packages 114 of storage device 116. Client application 112 may also be executed to publish a code package 114 to a store maintained by computing system 120.

Computing system 110 may comprise a laptop computer, a desktop computer, or a tablet computer, but embodiments are not limited thereto. Storage device 116 may comprise any suitable combination of volatile (e.g., Random Access Memory) and non-volatile (e.g., fixed disk) memory used by system 110 to store data. Computing system 110 may consist of any combination of computing hardware and software suitable to allow system 110 to execute program code to cause computing system 110 to perform the functions described herein and to store such program code and associated data.

Computing system 120 is depicted as a cloud-based computer server to represent an embodiment providing resource elasticity and communication via Web communication protocols, but embodiments are not limited thereto. Computing system 120 may comprise an on-premise server, a cloud-deployed virtual machine, or any other suitable computing system to provide the functions described herein.

According to some embodiments, client application 112 is a Web browser executing a Web client application corresponding to package editor 121 and package publisher 122 executed by computing system 120. Client application 112 therefore may communicate with package editor 121 and package publisher 122 to create and publish code packages. Such published code packages may be stored among packages 126 of storage system 124.

Also stored in storage system 124 is package metadata 125. As will be described in detail below, package metadata 125 includes, for each published code package 126, descriptive metadata and application version information. Advantageously, the same descriptive metadata may be associated with all code packages 126 that are configurations of a same workflow.

Computing systems 130 and 140 may be operated by users of code packages (i.e., automations). Applications 132, 142 may comprise standalone applications and/or web applications which execute within a web browser of system 130, 140 and interact with corresponding remote cloud-based applications to provide desired functionality. Users may therefore use applications 132, 142 to access package publisher 122 to identify desired ones of packages 126 based on package metadata 125 and to download identified packages 126 for local execution.

Applications 132, 142 may comprise any software applications for providing user functionality that are or become known, including but not limited to office productivity applications (e.g., document editing, spreadsheet, and calendaring applications) and data analytics applications. Generally, a user may initiate execution of one or more of applications 132, 142 and may interact with resulting displayed user interfaces of the executing applications to obtain the desired functionality therefrom and generate corresponding application data 136, 146.

Agent 134, 144 comprises program code which is executable to execute packages 137, 147. As is known in the art, a code package 137, 147 may be executed to cause one or more of applications 132 to perform desired actions. Execution of code packages 137, 147 may include invocation of one or more applications 132, 142 (if not already invoked on systems 130, 140 and performance of activities specified by the packages 137, 147 on respective user interface elements of the applications 132, 142 in a sequence designated by the packages 137, 147.

In one non-exhaustive example, agent 134 executes the instructions of a code package 137 to open a document editing application 132, to create a document using the document editing application and including the current date and time, to save the document to application data 136, to open an e-mail client application 132, to create a new e-mail, to attach the document from the document editing application 132 to the new e-mail, and to send the e-mail to a specific e-mail address. According to some embodiments, agent 134 may execute the instructions of a code package 137 to also or alternatively transmit requests to one or more remote Web services and receive responses therefrom. Execution of the instructions may be initiated by a user of computing system 130 manually (e.g., by instructing agent 134 to execute the code package 137), according to a predetermined schedule maintained by agent 134, or in response to a predefined trigger event monitored by agent 134.

Figure 2:
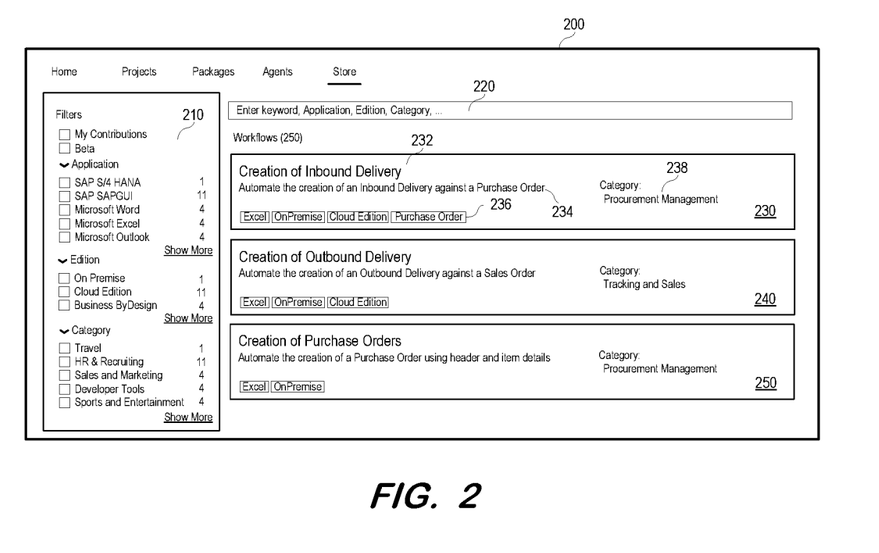
FIG. 2 is a view of a user interface for acquiring code packages of a code package platform presented by a computing device according to some embodiments.

FIG. 2 is a view of user interface 200 for identifying a workflow according to some embodiments. User interface 200 may be presented on a display screen of computing systems 130 or 140 according to some embodiments. For example, a user of computing system 130 may execute a Web browser of applications 132 to request communication with package editor 121. In response, package editor 121 provides information usable by computing system 130 to display user interface 200. In this regard, user interface 200 may comprise a Web page as well as a user interface of a standalone application.

A user may operate user interface 200 to specify filters and words which are used to search for a workflow. A workflow represents certain functionality, and is associated with one or more configurations (i.e., code packages) which provide the functionality. Configurations associated with a same workflow typically require different application versions for execution. For example, a first configuration associated with a given workflow may require a 2013 version of a document editing application and an on-premise version of a database application, while a second configuration of the given workflow may require the 2013 version of the document editing application and a cloud version of the database application.

User interface 200 includes filter panel 210 which allows a user to select any number of values by which to filter the workflows and/or configurations which have been published to the store. The selectable filter values may correspond to facets (e.g., application, edition, category) which are associated with the workflows and/or configurations. The facets are not limited to those shown in panel 210. A facet may represent descriptive metadata or technical information as described above. Data structures generated based on the facets may provide fast facet-based filtering of published workflows.

Input field 220 accepts search keywords from the user. The workflows may be searched/filtered based on any input search keywords as is known in the art. In some embodiments, all metadata associated with published workflows is indexed to provide fast determination of published workflows which correspond to input search keywords. The metadata associated with a workflow may include metadata associated with each configuration of the workflow as well as metadata which is associated with the workflow in general.

User interface 200 indicates that two-hundred fifty workflows (i.e., all published workflows) satisfy the specified filter values and keywords. Since no filter values are selected in panel 210 and no keywords have been entered in input field 220, the total number of available workflows is two-hundred fifty. Selection of one or more filter values from filter panel 210 and/or input of one or more words into field 220 will initiate a search function to determine workflows which match the one or more filter values and one or more words, and to display metadata of the determined workflows.

User interface 200 presents metadata 230, 240 and 250 associated with a respective three of the available two-hundred fifty workflows. Each of metadata 230, 240 and 250 may comprise a subset of metadata associated with the respective workflow. The subset may be intended to provide the user with enough information to select a presented workflow, and may be selected from descriptive metadata and technical information associated with all configurations of the presented workflow. For example, metadata 230 includes title 232, short description 234, tags 236 specifying associated applications, versions, and logical entities, and category 238.

Figure 3:
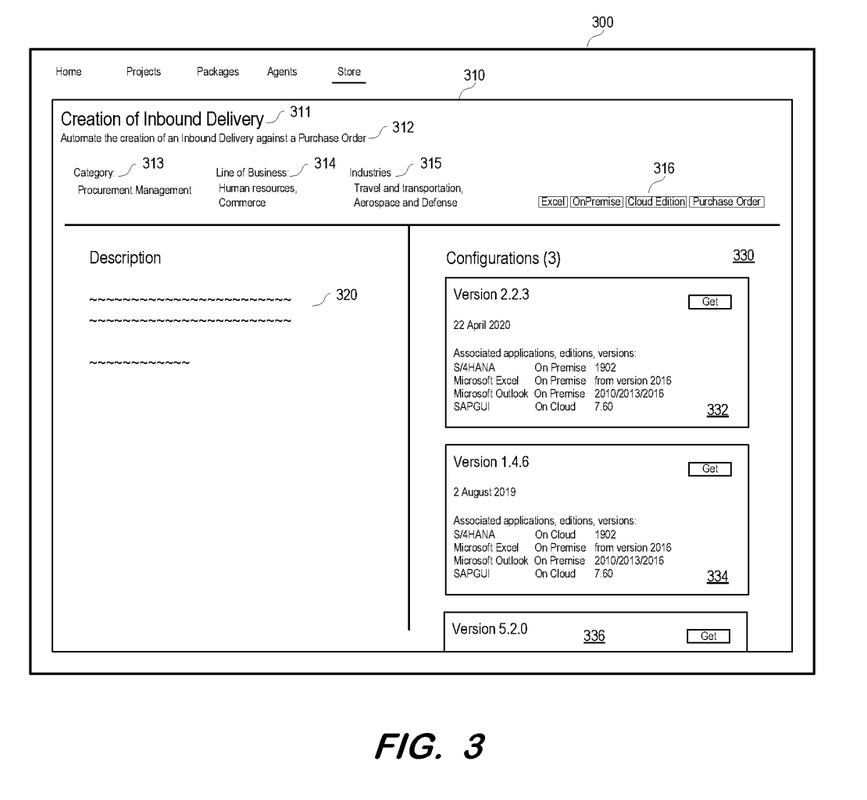
FIG. 3 is a view of a user interface for acquiring code packages of a code package repository presented by a computing device according to some embodiments.

It will be assumed that the user selects the first-displayed workflow of user interface 200. In response, user interface 300 of FIG. 3 is presented. Area 310 of interface 300 provides data associated with the selected workflow which is intended to assist the user in determining whether the workflow is suitable for her needs and to identify a suitable configuration of the workflow. In particular, area 310 includes title 311, short description 312, category 313, line of business 314, industries 315, tags 316 and long description 320.

Area 330 includes metadata specific to each configuration (i.e., code package) associated with the presented workflow. In other words, all of the other metadata presented in area 310 is associated with each of the three configurations shown in area 330, while metadata 332 is associated only with Version 2.2.3, metadata 334 is associated with Version 1.4.6, and metadata 336 is associated with Version 5.2.0. The metadata of each configuration includes the version number, a publication date and one or more applications required to execute the configuration, along with the specific edition and versions of the required applications.

Accordingly, metadata 311 through 320 presented in area 310 allows a user to determine whether the workflow is suitable for their needs, while area 330 allows a user to determine a suitable configuration of the workflow. Area 330 further includes a Get control associated with each configuration. A user may select a Get control to initiate download of the associated configuration to their local system. Once downloaded, the configuration may be executed by an agent on the local system as described above.

Figure 4:
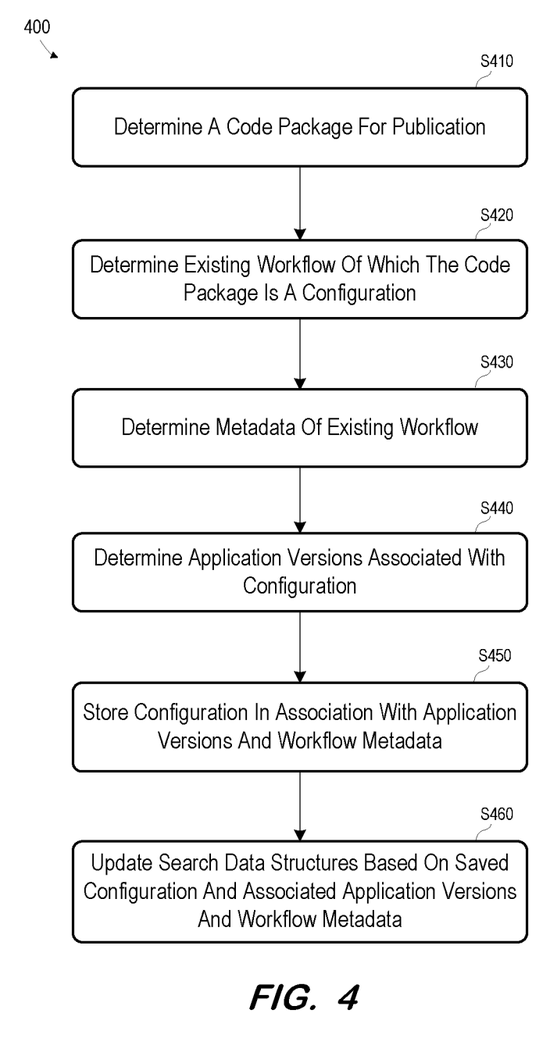
FIG. 4 comprises a flow diagram of a process to publish a code package to a code package repository according to some embodiments.

FIG. 4 comprises a flow diagram of process 400 to publish a code package to a code package repository according to some embodiments. Process 400 may be performed by package publisher 122 of FIG. 1, but embodiments are not limited thereto. Process 400 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 400 begins at S410, at which a code package to be published is determined. The determination may be based on user input. For example, a user or developer who has created a code package (e.g., an automation) may operate computing system 110 to access package publisher and to input a request to publish the code package via a user interface provided by package publisher 122.

Figure 5:
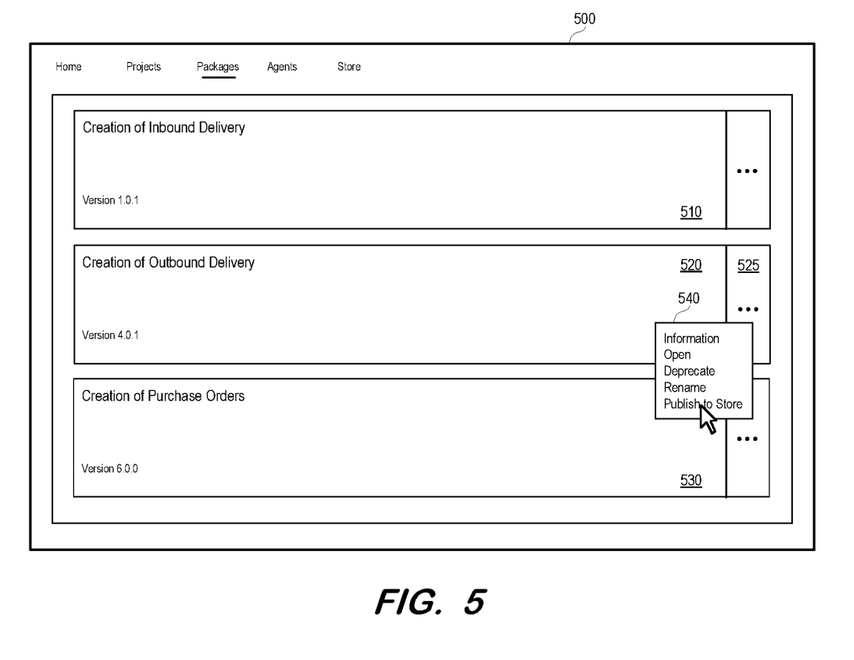
FIG. 5 is a view of a user interface for publishing code packages to a code package repository presented by a computing device according to some embodiments.

FIG. 5 is a view of user interface 500 according to some embodiments. User interface 500 may comprise a user interface provided by package editor 121 and/or package publisher 122. For example, a Web browser of computing system 110 may be executed to access a URL corresponding to package editor 121 and may receive a client Web application for execution in response thereto. Execution of the Web application causes presentation of interface 500 on a display of computing system 110.

User interface 500 lists packages 510, 520, 530 stored in packages 126. The listed packages may be packages created by the user who is accessing interface 500 but which have not yet been published for access by other users. The list may also include packages which have been published for access by other users.

As illustrated in FIG. 5, the user has selected area 525 corresponding to package 520, resulting in display of menu 540. Menu 540 includes a Publish to Store option. The Publish to Store option may be selected to newly-publish an unpublished package or to edit the metadata of an already-published package. The Publish to Store options may be presented only to the user who created the code package in some embodiments. It will be assumed that the Publish to Store option is selected, so that code package 520 is determined for publication at S410.

Figure 6:
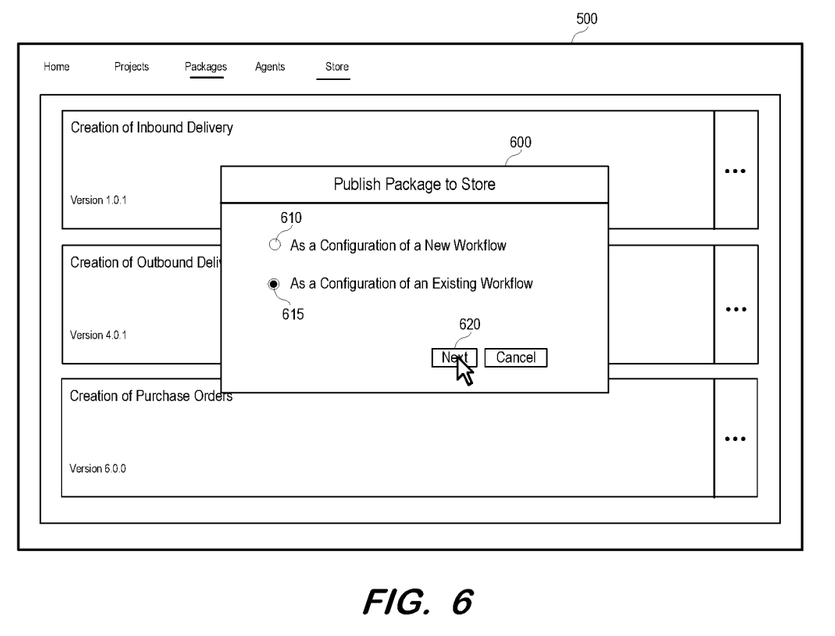
FIG. 6 is a view of a user interface for publishing code packages to a code package repository presented by a computing device according to some embodiments.

It is assumed that the code package determined at S410 is to be published as a configuration of an existing workflow. The existing workflow is determined at S420. In some embodiments, the user is presented with an option to publish the code package as a configuration of a new workflow or of an existing workflow. FIG. 6 illustrates user interface 600 which may be displayed in response to user selection of the Publish to Store option of menu 540. User interface 600 includes selection buttons 610 and 615. The user selects button 610 and Next control 620 if the code package is to be published as a configuration of a new workflow and selects button 615 and Next control 620 if the code package is to be published as a configuration of an existing workflow.

Figure 7:
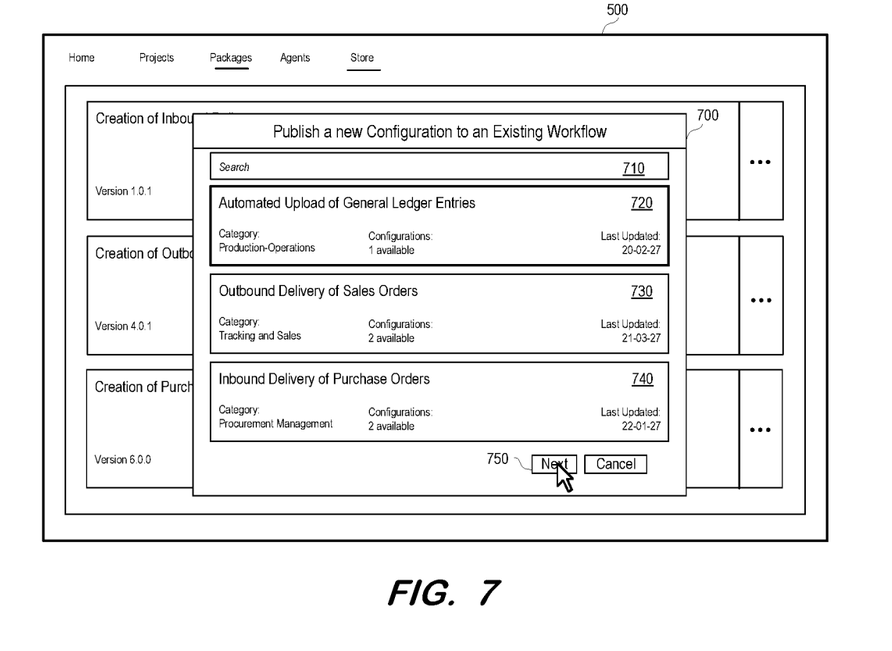
FIG. 7 is a view of a user interface for publishing code packages to a code package repository presented by a computing device according to some embodiments.

Process 400 assumes that the user selects button 615 and an existing workflow. FIG. 7 illustrates dialog 700 which may be presented in response to selection of button 615 and Next control 620. If button 610 was selected, the user would not be presented with dialog 700 but would instead be required to provide all of the descriptive metadata of the new workflow (e.g., title, description, category, tags, etc.), as well as the applications, editions and versions required to execute the code package.

Dialog 700 lists workflows 720, 730 and 740 from which the workflow determined at S420 may be selected. The user may enter search terms into search input field 710 in order to filter the available workflows to facilitate identification of a desired existing workflow. In the illustrated example, the user has selected workflow 720 and selected Next control 750.

Metadata of the existing workflow is determined at S430. The metadata was previously-generated when the existing workflow (and its first configuration) were published to the store. The metadata may include the descriptive metadata descried herein and may be stored in association with an identifier of the workflow in package metadata 125.

Figure 8:
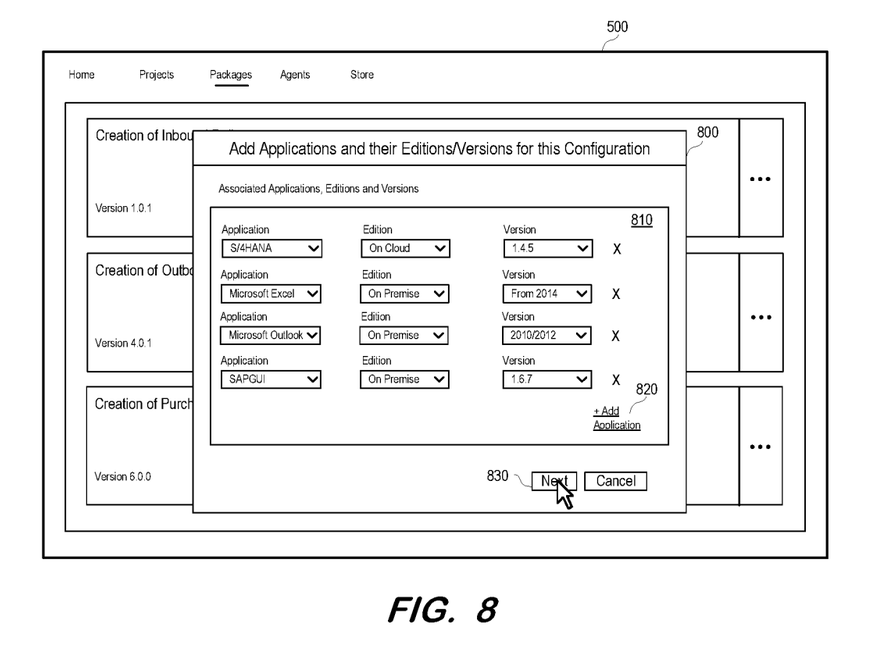
FIG. 8 is a view of a user interface for publishing code packages to a code package repository presented by a computing device according to some embodiments.

Next, at S440, application versions associated with the new configuration are determined. Again, the application versions may be determined based on user input. FIG. 8 illustrates dialog 800 which may be presented in response to selection of workflow 720 and Next control 750. Dialog 800 includes drop-down menu area 810. Each row of area 810 includes three drop-down selection menus for specifying, respectively, an application, an edition, and a version. An "X" control in each row allows deletion of a row (i.e., an application), while control 820 allows a user to add a new row (i.e., a new application). As mentioned herein, the applications/editions/versions specified in area 810 are required for execution of the configuration.

The user selects Next control 830 once all required applications are specified in order to proceed. At S450, the configuration is saved in association with the application versions and the workflow metadata. According to the present example, the configuration is saved in packages 126 and package metadata 125 is updated to associate the existing workflow metadata with the configuration. Moreover, identifiers of the application, versions and editions received at S440 are associated with the configuration within package metadata 125.

Figure 9:
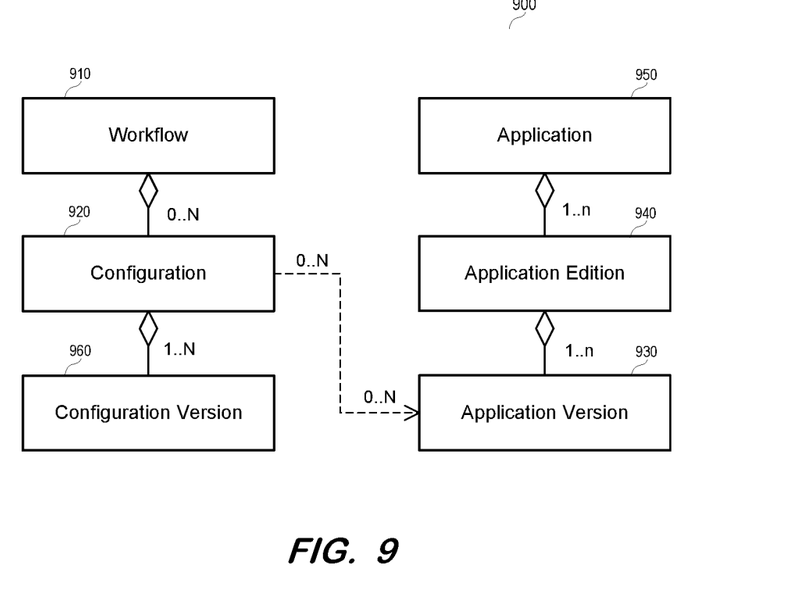
FIG. 9 is a view of a relational data model for storing code packages and associated metadata according to some embodiments.

FIG. 9 is a view of relational data model 900 for storing code packages (i.e., configurations) and associated metadata according to some embodiments. This storage may therefore utilize a relational database as is known in the art. As shown, each workflow 910 may be associated with zero or more configurations 920. Each configuration 920 may be associated with zero or more application versions 930, each of which is associated with an application edition 940 and an application 950. Model 900 also contemplates one or more versions 960 of each configuration 920.

Relational data model 900 advantageously allows a configuration 920 to inherit the descriptive metadata associated with its parent workflow 910. By leveraging the logical relation between a workflow 910 and its configurations 920 in this manner, embodiments may reduce the amount of metadata which must be manually provided in order to publish a configuration. Moreover, relevant configurations may be more efficiently identified by a user.

Returning to process 400, search data structures are updated at S460 based on the newly-saved configuration and its associated application versions and workflow metadata. Updating the search data structures allows the newly-saved configuration to be identified by a user search of the code package store as described above. Moreover, the workflow of the configuration may be identified by searches which would not have previously turned up the workflow, due to new application versions associated with the new configuration. In some embodiments, the search structures include inverted indices which associate words with workflows and/or configurations whose metadata includes the words. The search data structures may also include data structures which facilitate filtering via facets as is known in the art.

Figure 10:
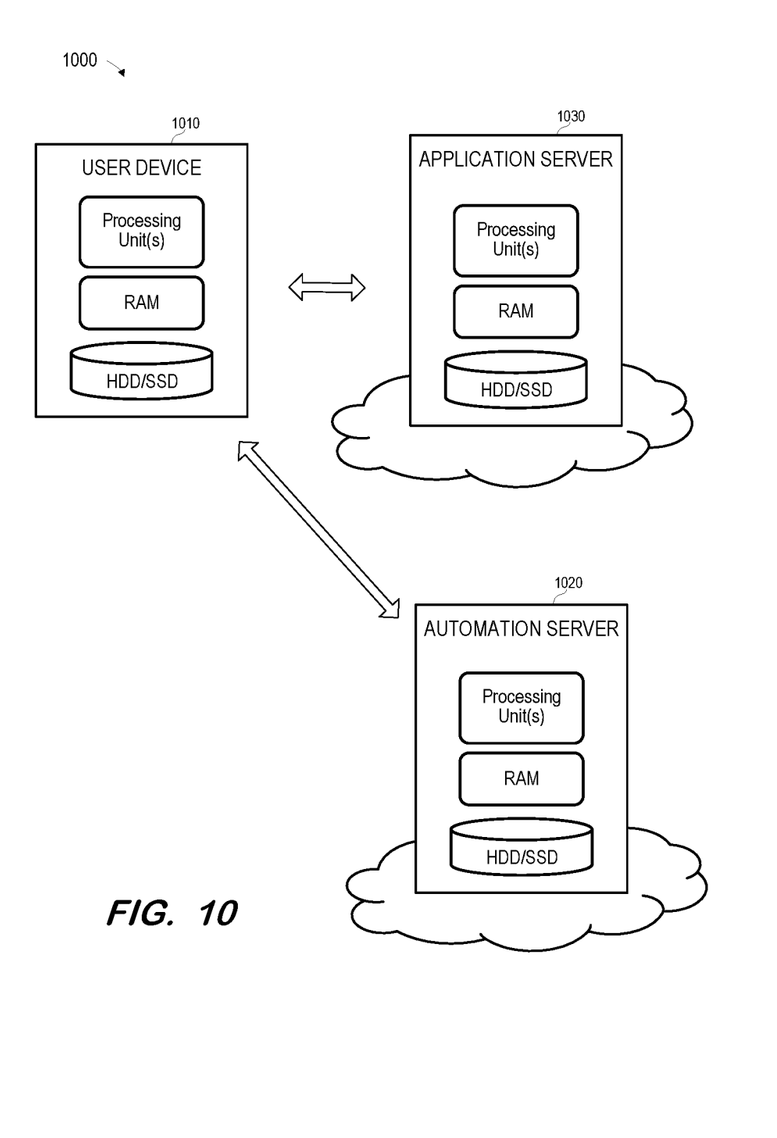
FIG. 10 is a block diagram of a cloud-based system according to some embodiments.

FIG. 10 is a block diagram of cloud-based system 1000 according to some embodiments. In this regard, automation server 1020 and application server 1030 may comprise cloud-based compute resources, such as virtual machines, allocated by a public cloud provider providing self-service and immediate provisioning, autoscaling, security, compliance and identity management features.

User device 1010 may interact with user interfaces of a service or application executing on automation server 1020, for example via a Web browser executing on user device 1010. User device 1010 may create an automation (i.e., a code package, a configuration) using the user interfaces and publish the automation to a store residing on automation server 1020 based on an existing workflow as described herein.

User device 1010 may also identify and download an automation from the store residing on automation server 1020. An agent executing on user device 1010 may execute the downloaded automation to operate one or more local applications of user device 1010 and one or more remote applications or services provided by application server 1030 in a manner and sequence defined by the automation. The operation may be manually triggered or responsive to a schedule or other triggering event.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method comprising:
receiving an instruction to publish a first code package to a repository, where the first code package is executable by first editions of a first two or more applications to cause the first editions of the first two or more applications to perform a first sequence of steps;
in response to the instruction:
determining a second code package stored in the repository and executable by second editions of the first two or more applications to cause the second editions of the first two or more applications to perform the first sequence of steps, the second code package stored in the repository in association with first metadata identifying the second editions of the first two or more applications; and
storing the first code package in the repository in association with second metadata identifying the first sequence of steps and the first editions of the first two or more applications;
updating one or more search data structures of the repository based on the stored second metadata, the one or more search data structures comprising a data structure for filtering by facets and an inverted index;
receiving a search query specifying the first sequence of steps from a first computing system; and
in response to the search query:
identifying the first code package and the second code package in the repository based on the search query, the first metadata and the second metadata;
returning the first metadata and the second metadata;
receiving a selection of the first code package; and
in response to the selection, initiate a download of the first code package to the first computing system for execution by an agent executing on the first computing system and by the first editions of the first two or more applications executing on the first computing system.

2. A method according to claim 1, further comprising:
receiving a second instruction to publish a third code package to the repository, where the third code package is executable by third editions of the first two or more applications to cause the third editions of the first two or more applications to perform the first sequence of steps; and
in response to the second instruction, storing the third code package in the repository in association with third metadata identifying the first sequence of steps and the third editions of the first two or more applications.

3. A method according to claim 2, wherein the first metadata comprises a workflow title and a workflow short description.

4. A method according to claim 3, wherein the first code package and the third code package are automations, wherein an automation is executable by the agent of the first computing system to cause the first computing system to operate two or more applications executing on the first computing system as specified by the automation.

5. A method according to claim 1, wherein the first code package is an automation, wherein the automation is executable by the agent of the first computing system to cause the first computing system to operate the two or more applications as specified by the automation.

6. A system comprising:
a memory storing processor-executable program code; and
a processing unit to execute the program code to cause the system to:
receive an instruction to publish a first code package to a repository, where the first code package is executable by first editions of a first two or more applications to cause the first editions of the first two or more applications to perform a first sequence of steps;
in response to the instruction:
determine a second code package stored in the repository and executable by second editions of the first two or more application to cause the second editions of the first two or more applications to perform the first sequence of steps, the second code package stored in the repository in association with first metadata identifying the second editions of the first two or more applications; and
store the first code package in the repository in association with second metadata identifying the first sequence of steps and the first editions of the first two or more applications;
update one or more search data structures of the repository based on the stored second metadata, the one or more search data structures comprising a data structure for filtering by facets and an inverted index;
receive a search query specifying the first sequence of steps from a first computing system; and
in response to the search query:
identify the first code package and the second code package in the repository based on the search query, the first metadata and the second metadata;
return the first metadata and the second metadata;
receive a selection of the first code package; and
in response to the selection, initiate a download of the first code package to the first computing system for execution by an agent executing on the first computing system and by the first editions of the first two or more applications executing on the first computing system.

7. A system according to claim 6, the processing unit to execute the program code to cause the system to:
receive a second instruction to publish a third code package to the repository, where the third code package is executable by third editions of the first two or more applications to cause the third editions of a first two or more applications to perform the first sequence of steps; and
in response to the second instruction, store the third code package in the repository in association with third metadata identifying the first sequence of steps and the third editions of the first two or more applications.

8. A system according to claim 7, wherein the first metadata comprises a workflow title and a workflow short description.

9. A system according to claim 8, wherein the first code package and the third code package are automations, wherein an automation is executable by the agent of the first computing system to cause the first computing system to operate two or more applications executing on the first computing system as specified by the automation.

10. A system according to claim 6, wherein the first code package is an automation, wherein the automation is executable by the agent of the first computing system to cause the first computing system to operate the two or more applications as specified by the automation.

11. A non-transitory computer-readable medium storing program code executable by one or more processing units to cause a computing system to perform operations comprising:
  receiving an instruction to publish a first code package to a repository, where the first code package is executable by first editions of a first two or more applications to cause the first editions of the first two or more applications to perform a first sequence of steps;
  in response to the instruction:
  determining a second code package stored in the repository and executable by second editions of the first two or more application to cause the second editions of the first two or more applications to perform the first sequence of steps, the second code package stored in the repository in association with first metadata identifying the second editions of the first two or more applications; and
  storing the first code package in the repository in association with second metadata identifying the first sequence of steps and the first editions of the first two or more applications;
  updating one or more search data structures of the repository based on the stored second metadata, the one or more search data structures comprising a data structure for filtering by facets and an inverted index;
  receiving a search query specifying the first sequence of steps from a first computing system; and
  in response to the search query:
    identifying the first code package and the second code package in the repository based on the search query, the first metadata and the second metadata;
    returning the first metadata and the second metadata;
    receiving a selection of the first code package; and
    in response to the selection, initiate a download of the first code package to the first computing system for execution by an agent executing on the first computing system and by the first editions of the first two or more applications executing on the first computing system.

12. A medium according to claim 11, program code executable by one or more processing units to cause a computing system to perform operations comprising:
  receiving a second instruction to publish a third code package to the repository, where the third code package is executable by third editions of the first two or more applications to cause the third editions of the first two or more applications to perform the first sequence of steps; and
  in response to the second instruction, storing the third code package in the repository in association with third metadata identifying the first sequence of steps and the third editions of the first two or more applications.

13. A medium according to claim 12, wherein the first code package and the third code package are automations, wherein an automation is executable by the agent of the first computing system to cause the first computing system to operate two or more applications executing on the first computing system as specified by the automation.

14. A medium according to claim 11, wherein the first code package is an automation, wherein the automation is executable by the agent of the first computing system to cause the first computing system to operate the two or more applications as specified by the automation.

* * * * *